United States Patent [19]

Gray

[11] 4,425,203

[45] * Jan. 10, 1984

[54] HYDROGEN EVOLUTION CATHODE

[75] Inventor: Thomas J. Gray, Guilford, Conn.

[73] Assignee: Olin Corporation, New Haven, Conn.

[*] Notice: The portion of the term of this patent subsequent to Feb. 22, 2000 has been disclaimed.

[21] Appl. No.: 380,155

[22] Filed: May 20, 1982

Related U.S. Application Data

[63] Continuation-in-part of Ser. No. 301,681, Sep. 14, 1981, Pat. No. 4,374,712, which is a continuation-in-part of Ser. No. 80,745, Oct. 1, 1979, Pat. No. 4,289,650, which is a continuation-in-part of Ser. No. 25,153, Mar. 29, 1979, Pat. No. 4,240,895.

[51] Int. Cl.³ .................. C25B 1/04; C25B 11/06
[52] U.S. Cl. .................. 204/129; 204/293
[58] Field of Search .................. 204/290 R, 293, 129; 252/477 Q, 425.3

[56] References Cited

U.S. PATENT DOCUMENTS

| | | | |
|---|---|---|---|
| 1,628,190 | 5/1927 | Raney | 252/477 Q X |
| 1,915,473 | 6/1933 | Raney | 252/477 Q X |
| 3,272,728 | 9/1966 | Handorff et al. | 204/35 |
| 3,291,714 | 12/1966 | Hall et al. | 204/256 |
| 3,674,710 | 7/1972 | Richter et al. | 420/441 X |
| 4,033,837 | 7/1977 | Kuo et al. | 204/98 |
| 4,043,946 | 8/1977 | Sanker et al. | 252/466 J |
| 4,049,580 | 9/1977 | Oden et al. | 252/466 J |
| 4,116,804 | 9/1978 | Needes | 204/284 |
| 4,153,578 | 5/1979 | De Thomas et al. | 252/438 |
| 4,162,204 | 7/1979 | Kuo | 204/43 R |
| 4,248,679 | 2/1981 | Welch et al. | 204/98 |
| 4,248,680 | 2/1981 | Carlin et al. | 204/98 |
| 4,251,478 | 2/1981 | Welch et al. | 204/98 |

FOREIGN PATENT DOCUMENTS

| | | | |
|---|---|---|---|
| 206867 | 12/1959 | Austria | 252/477 Q |
| 1909031 | 9/1970 | Fed. Rep. of Germany | 502/301 |
| 1928929 | 12/1970 | Fed. Rep. of Germany | 502/301 |

Primary Examiner—F. Edmundson
Attorney, Agent, or Firm—Arthur E. Oaks; Donald F. Clements

[57] ABSTRACT

An improved hydrogen evolution cathode with a conductive metal core and an integral Raney-type catalytic surface predominantly derived from an adherent ternary aluminide Beta structured intermetallic crystalline precursory outer portion of the metal core is disclosed. The precursory outer portion preferably has molybdenum and titanium added to give a precursor alloy having the formula $Ni_xMo_yTi_zAl_3$ where x is within the range of from about 75 to about 94 weight percent, y is within the range of from about 5 to about 20 weight percent and z is within the range of from about 1 to about 5 weight percent of the Ni-Mo-Ti portion of the alloy. Also disclosed is a method of producing a low overvoltage cathode. The method includes the steps of taking a Ni-Mo-Ti core or substrate having about 5–20 weight percentage of Mo and about 1–5 weight percent Ti and coating it with aluminum, heat treating to form a Ni-Mo-Ti-Al quaternary alloy with mostly $NiAl_3$ (ordered orthorhombic) crystal structure and then leaching out the Al to produce a ternary NiMoTi alloy Raney surface. A method for utilizing said low overvoltage cathode for producing hydrogen and an exemplary cell for so doing are also disclosed.

8 Claims, 2 Drawing Figures

HYDROGEN EVOLUTION CATHODE

This is a continuation-in-part of application Ser. No. 301,681, filed Sept. 14, 1981, now U.S. Pat. No. 4,374,712 which in turn is a continuation-in-part of application Ser. No. 080,745, filed Oct. 1, 1979, now U.S. Pat. No. 4,289,650, which in turn is a continuation-in-part of application Ser. No. 025,153, filed Mar. 29, 1979, now U.S. Pat. No. 4,240,895.

FIELD OF INVENTION

The invention relates to an improved Raneyized hydrogen evolution cathode for use in electrolytic cells adapted to produce hydrogen by the electrolysis of brine or water.

PRIOR ART STATEMENT

In view of the phenomenal jump in energy costs and the increased scarcity of industrial fuel supplies, there has been and continues to be a flurry of research activity in the electrolysis field to find ways to reduce the amount of power used in electrolysis processes. For many years, it has been customary to use steel cathodes in chlor-alkali cells, even though a substantial amount of power is used in overcoming what is called "hydrogen overvoltage" at the cathode. Hydrogen overvoltage is largely an inherent characteristic of the metallic surface in contact with the electrolyte so there is a continual need and desire to come up with better cathode surfaces to reduce this overvoltage and thereby decrease the power consumption of the cell.

It is known that active, porous nickel can be produced by selectively dissolving a soluble component, such as aluminum or zinc, out of an alloy of nickel and the soluble component. A porous nickel of this type and the alloy from which it is produced are generally called "Raney nickel" or "Raney alloy" after their inventor. See U.S. Pat. Nos. 1,563,787 (1925), 1,628,191 (1927) and 1,915,473 (1933). There are various methods for producing this Raney nickel, and various applications for this metal are known.

It is also known to use such Raney nickel surfaces on cathodes for chlor-alkali cells. For example, U.S. Pat. No. 4,116,804 filed Nov. 17, 1976, and issued Sept. 26, 1978, to C. Needes and assigned to DuPont de Nemours describes an electrode, hereafter "Needes electrode," for use as a hydrogen evolution cathode in electrolytic cells in which a cohesive surface layer of Raney nickel is in electrical contact with a conductive metal core having an outer layer of at least 15 percent nickel (see Table 4 thereof), characterized in that the surface layer of Raney nickel is thicker than 75 $\mu$m and has a mean porosity of at least 11 percent. The catalytic surface layer consists predominantly of $Ni_2Al_3$ grains from which at least 60 percent of aluminum has been leached out with an aqueous base. An overvoltage of about 60 millivolts is alleged. To phrase the same thing relative to conventional cathodes, reductions of 315 to 345 millivolts in hydrogen overvoltage as compared with mild steel cathodes is alleged. However, subsequent testing indicates much higher overvoltages and actual reductions of only 100-150 millivolts. Furthermore, spalling or delamination of the coating has been observed upon additional testing. The patent teaches that any Raney nickel which forms from the $NiAl_3$ phase is mechanically weak and does not adhere well and is generally lost during leaching. The patent also teaches that $Ni_2Al_3$ (Gamma phase) is the preferred intermetallic precursor and governs the activity of the coating and that the heat treatment should be such that the proportion of $Ni_2Al_3$ is maximized. This mechanical weakness of Raney nickel from $NiAl_3$ is unfortunate because it was previously known that Raney Ni from $NiAl_3$ (Beta phase) is more active for hydrogen desorption than is Raney Ni from $Ni_2Al_3$ (Gamma phase). See, for example, A. A. Zavorin et al, Kinetika i Kataliz, Vol. 18, No. 4, pp. 988-994, (USSR, July-August, 1977) which explains hydrogen is more weakly "bonded" in Raney Ni from $NiAl_3$ than from $Ni_2Al_3$, that there are more hydrogen adsorption centers in Raney Ni from $NiAl_3$ than $Ni_2Al_3$ and that the heat of desorption is lower for Raney Ni from $NiAl_3$ than $Ni_2Al_3$.

Golin, Karaseva and Serykh in *Elektrokhimiya*, Vol. 13, No. 7, pp. 1052-1056 (USSR, July, 1977) disclose a 10 percent Mo, 45 percent Ni, 45 percent Al alloy which, upon leaching, yields a Raney catalytic surface with extremely low activation energy for hydrogen oxidation such as would occur in a hydrogen-oxygen fuel cell. No mention of hydrogen evolution (i.e. hydrogen reduction) catalysis is given or suggested.

In addition, U.S. Pat. No. 3,673,116 which issued June 27, 1972, to Richter, discloses mixed Raney nickel catalysts of nickel, iron, and zirconium or titanium for use as a fuel cell electrode.

Other less pertinent prior art is discussed in my parent application, now U.S. Pat. No. 4,240,895 which issued Dec. 23, 1980.

The invention further provides an improved low overvoltage electrode for use as a hydrogen evolution cathode in an electrolytic cell, the electrode being of the type that has an integral Raney metal surface layer in electrical contact with a conductive metal core, wherein the improvement comprises: said Raney metal surface layer is predominantly derived from adherent Beta phase $(Ni_xMo_yTi_z)Al_3$ crystalline precursory surface layer, where x is less than 0.94, y is within the range of from about 0.05 to about 0.20 and z is within the range of from about 0.01 to about 0.05 weight percent of the NiMoTi portion of the alloy.

The invention also provides an improved low overvoltage electrode for use in a hydrogen evolution cathode in an electrolytic cell, the electrode being of the type that has an integral Raney metal surface layer in electrical contact with a conductive metal core, wherein the improvement comprises: said Raney metal surface is derived from an adherent Ni-Mo-Ti-Al Beta phase quaternary crystalline intermetallic layer stabilized by substitution of a stabilizing amount of molybdenum and titanium for some of the nickel in the crystalline structure of said crystalline layer.

The invention further provides a method of producing a low overvoltage electrode for use as a hydrogen evolution cathode in an electrolytic cell which comprises the steps of:

(a) coating with aluminum the surface of a clean non-porous conductive base metal structure of an alloy of about 5-20 percent molybdenum, about 1-5 weight percent Ti and 94-75 percent nickel;

(b) heat treating said coated surface by maintaining said surface at a temperature of from 660° to 750° C. for a time sufficient to diffuse a portion of said aluminum into outer portions of said structure to produce an integral nickel-molybdenum-titanium-aluminum alloy layer in said outer portions consisting predominantly of Beta phase grains but insufficient to create a predominance of Gamma phase grains in said outer portions; and (c) leaching out residual aluminum and intermetallics from the alloy layer until a Raney nickel-molybdenum-titanium layer is formed integral with said structure.

This invention further provides a method of generating hydrogen from a hydrogen evolution cathode by passing an electric current through an aqueous electrolyte between the anode and said hydrogen evolution cathode of an electrolytic cell wherein said cathode has a monolithic structure having a surface formed from an integral precursory, adherent Raney Beta phase quaternary alloy represented by the formula $Ni_xMo_yTi_zAl_3$, where x is the weight percent of nickel, y is the weight percent of molybdenum and z is the weight percent of titanium, in the combined weight of nickel, molybdenum and titanium, and where x ranges from about 75 to about 94 percent by weight, y ranges from about 20 to about 5 percent by weight and z ranges from about 5 to about 1 percent by weight, and which has had from about 75 to about 95 percent of the aluminum leached from said surface with a strong aqueous base so as to form an active porous Raney Beta phase nickel-molybdenum-titanium surface layer whereby the hydrogen overvoltage of said surface is reduced.

The invention also comprises a design and the use of a hydrogen evolution electrolytic cell having a low overvoltage cathode, said cathode being comprised of a monolithic Raney surface structure as defined above.

BRIEF DESCRIPTION OF THE DRAWINGS

The invention will be better understood by reference to the attached drawings which are provided by way of illustration and in which.

DETAILED DESCRIPTION OF PREFERRED EMBODIMENTS

Figure 1:
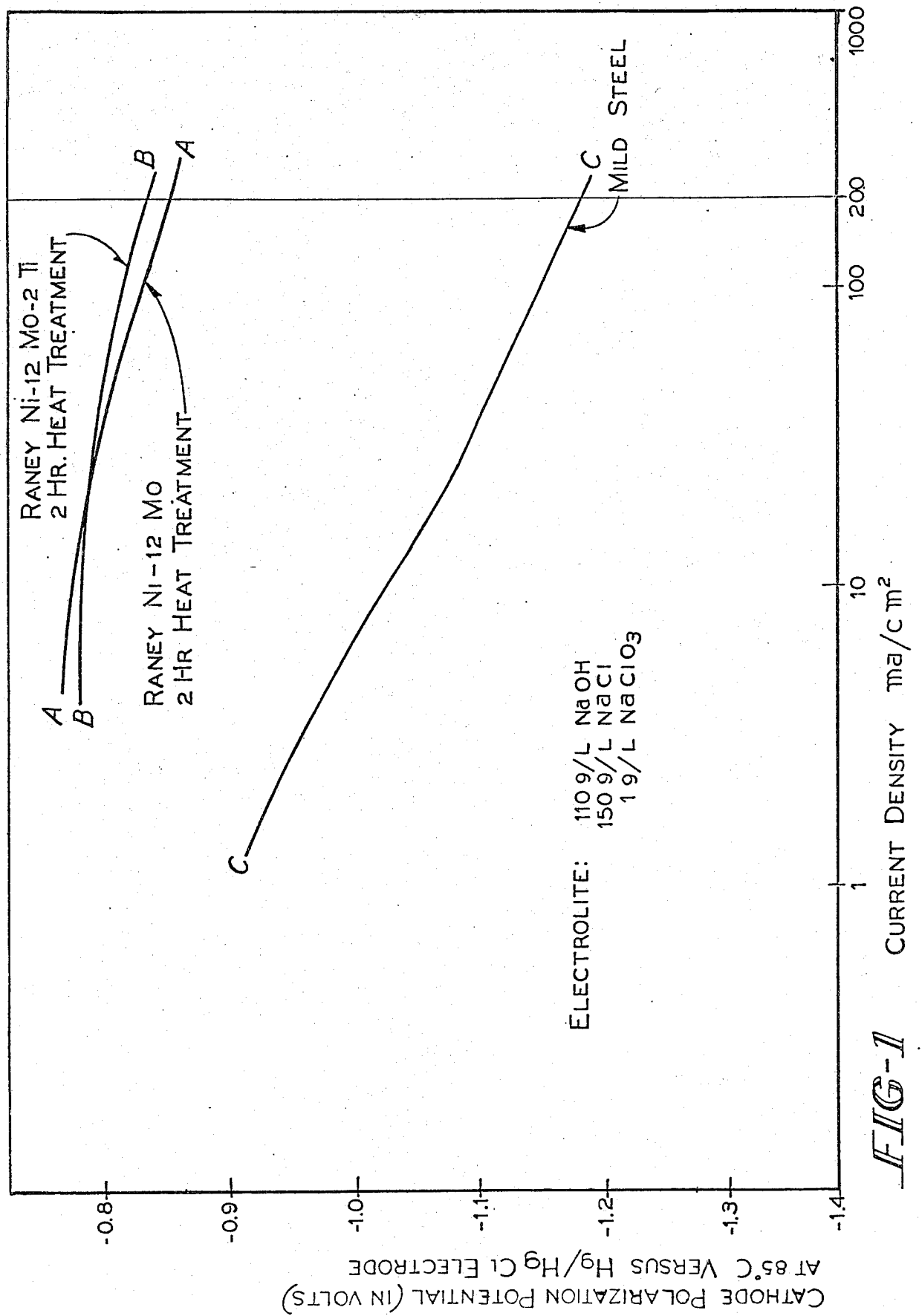
FIG. 1 is a graph of polarization potential versus time for a Raney Ni-Mo-Ti cathode of the present invention as compared with a Raney Ni-Mo cathode prepared according to the disclosure of my parent application now U.S. Pat. No. 4,240,895. A comparison with mild steel is also made.

FIG. 1 shows the overpotential curves versus current density for two catalytically coated cathodes, that of the present invention (Curve B—B) and that of the invention of the '895 Patent (Curve A—A) both prepared similarly from Beta phase precursor. Each has identical percent by weight of molybdenum (12%) and the same method (dipping) of depositing the aluminum prior to identical heat treatment for two hours at 725° C. However, the cathode of the present invention has 2 percent by weight of added titanium. The addition of 2 percent Ti was found to produce, upon subsequent Raney treatment, a β-Raney Ni-12Mo-2Ti cathode coating having about 50 millivolts less hydrogen overvoltage than that exhibited by a β-Raney Ni-12Mo cathode coating at a current density of 200 milliamps/cm². The test method was the same as in the '895 Patent. A comparison was also made with a mild steel cathode as shown by line C—C. It seems clear that the difference in titanium content was responsible for the difference in potential since all other parameters of the comparative test were identical.

It is also noted that, as with added molybdenum alone, an unexpected and surprising result is achieved when both molybdenum and titanium are added to a Beta phase ($NiAl_3$) intermetallic. The Beta phase formation is stabilized by the addition of molybdenum and titanium in the amount of about 5–20 percent by weight and about 1–5 percent by weight, respectively, of the total weight of nickel, titanium and molybdenum. That is, the titanium does not harm this "Beta-stabilizing" effect of the molybdenum. Both molybdenum and titanium are apparently captured in the ordered orthorhombic Beta phase crystal structure such that the Beta phase can be represented by the formula $Ni_xMo_yTi_zAl_3$ where x, y, and z are the weight percent nickel, molybdenum and titanium, respectively, in the total weight of nickel, titanium and molybdenum. By "stabilized" is meant that once the Beta phase forms it has less of a tendency to transform to a Gamma phase ($Ni_2Al_3$) crystal structure and thus the elevated heat treatment temperature can last longer without as much undesirable Gamma phase being formed. In fact, the heat treatment at the optimum 725° C. can last for 2 hours, or 4 hours or even 6 hours with a β-Raney Ni-Mo-Ti cathode still being produced. In fact, two hours was used on the samples in FIG. 1. Since it was shown in the '895 Patent that the Beta phase is the intermetallic of choice, this is an important advantage of the Ni-Mo-Ti-Al quaternary alloy over Ni-Al binary alloys.

One preferred electrode is a monolithic structure of a Ni-Mo-Ti alloy of 5–20 percent and most preferably from about 10–16 percent by weight molybdenum and about 75–94 percent and most preferably 80–88 percent by weight nickel with from about 1–5 percent and most preferably from about 2–4 percent by weight titanium which has been given a Raney treatment by dipping in molten aluminum and heating for about 1–360 minutes in an inert atmosphere at a temperature of from about 660° C. to about 855° C. to produce a Beta phase crystal structure. A temperature of about 660° C. to about 750° C. and a time of about 1–30 or even 5–15 minutes are more preferred because this gives sufficient time for enough aluminum to interdiffuse into the nickel to provide maximum preponderance of $NiAl_3$ or Beta phase over Gamma phase ($Ni_2Al_3$) but does not allow enough time for the diffusion to result in the preponderance of undesirable Gamma phase ($Ni_2Al_3$) as is specifically called for in U.S. Pat. No. 4,116,804.

Contrary to the disclosure of U.S. Pat. No. 4,116,804, it has been surprisingly found that the Beta phase $NiAl_3$, with molybdenum and titanium added thereto, is not lost during leaching and in fact experiences no appreciable thinning during subsequent use in a chlor-alkali cell.

The inclusion of from about 1 to about 5 percent by weight titanium in the Ni-Mo alloy in order to produce a NiMoTi ternary alloy has given a further surprise in that a further reduction of 50 millivolts overvoltage (at 200 ma/cm²) in cathode overvoltage is achieved. Since the Raney NiMo alloy coating already exhibited such a low overvoltage it is most surprising that any additional lowering occured from added titanium.

The thickness of the porous Ni-Mo-Ti exterior surface of the electrode generally is less than about 75 microns and preferably ranges from about 30 to about 60 microns. Following leaching with alkali metal hydroxide, the aluminum content of the exterior surface has been reduced by at least about 65 percent, and preferably by from about 75 to about 95 percent by weight.

Advantageous use can be made of the electrodes of this invention, especially as hydrogen-evolution cathodes in cells intended for the electrolysis of brine, water or the like. The electrodes are particularly preferred for use in brine electrolysis cells, either for alkali metal hydroxide or chlorate production wherein the high electrochemical activity of the β-Raney nickel-titanium-molybdenum surface remains constant for long periods of extended continuous use.

Figure 2:
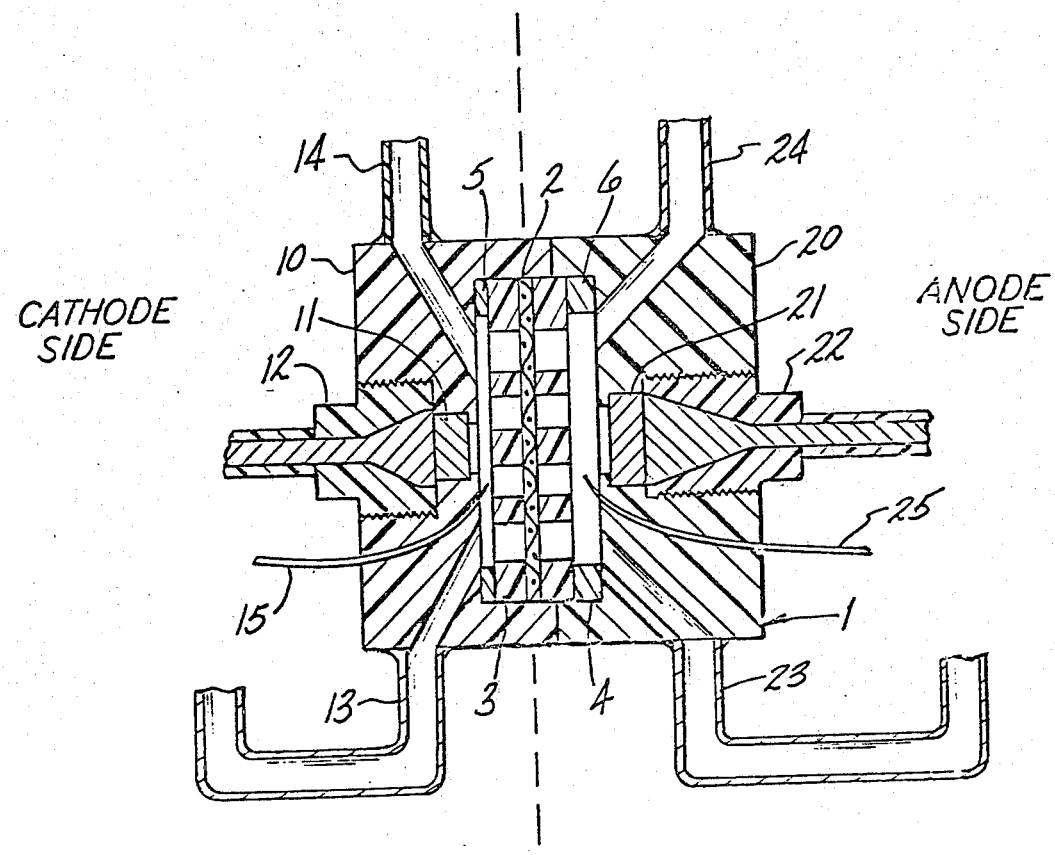
FIG. 2 is a sectional schematic view of a typical test cell useful in the preparation of sodium hydroxide and chlorine from salt brine.

FIG. 2 is a sectional schematic diagram of an electrochemical test cell, used for measuring the cathode potentials of the various cathode electrodes of the examples below.

Test cell 1, made of tetrafluoroethylene ("TFE"), is divided by membrane 2 into two chambers, cathode chamber 10 and anode chamber 20. Membrane 2, which is placed between two TFE separators 3 and 4 sealed in place by caustic resistant gaskets 5 and 6, respectively, is made of a homogeneous film 7 miles thick of 1200 equivalent weight perfluorosulfonic acid resin which has been chemically modified by ethylene diamine converting a depth of 1.5 mils to the perfluorosulfonamide laminated with a "T-12" tetrafluoroethylene filament fabric, marketed by the DuPont Company under the trademark Nafion ® 227.

A circular titanium anode 21 of two square centimeters area coated with a titanium oxide-ruthenium oxide mixed crystal is installed at the end of the anode current collector 22 in anode chamber 20. Cathode 11 of test cell 1 is installed at the end of cathode current collector 12 in cathode chamber 10. Perforated tetrafluoroethylene separators 3 and 4 and gaskets 5 and 6 are placed between membrane 2 and anode 21 and cathode 11, respectively.

A circular area of one square centimeter of the porous Raney nickel alloy surface of the test cathode 11 is exposed to the interior of cathode chamber 20. Cathode 11 and anode 21 are connected electrically to controllable voltage source by cathode current collector 12 and anode current collector 22. An ammeter (not shown) is connected in the line between the two electrodes. The entire cell 1 is then immersed in a liquid bath which is thermostatically controlled to give a constant operating temperature of about 85° C.

Catholyte, consisting of an aqueous solution containing about 11 weight percent sodium hydroxide, 15 weight percent sodium chloride and 0.1 weight percent sodium chlorate, (thereby simulating a diaphragm cell electrolyte), is pumped through inlet 13 into the cathode compartment at a rate which establishes an overflow through outlet 14. The catholyte is maintained at 85° C. Similarly, anolyte consisting of an aqueous brine solution having a pH of about 1.5 and containing 24–26 weight percent sodium chloride, is pumped through inlet 23 into the anode compartment and overflowed through outlet 24. The salt concentrations of the catholyte and anolyte are typical of that encountered in commercial diaphragm cells used in the electrolysis of brine. The use of separate catholyte and anolyte feed, rather than a single brine feed, assures better control of the desired catholyte composition. The catholyte and anolyte flows are controlled so that there is a small flow of solution from the anode to the cathode compartment, which flow is sufficient to assure ionic conductivity across the cell, but insufficient to significantly affect the catholyte composition.

Luggin tetrafluoroethylene capillary 15, installed in the cathode chamber 10 and Luggin capillary 25, installed in the anode chamber 20 are positioned ½ mm from the membrane surface and are each connected to a respective mercury-mercury oxide reference electrode or "S.H.E." (not shown), which in turn is connected through voltmeter (not shown) to the other electrode of cell 10. A Luggin capillary is a probe which, in making ionic or electrolytic contact between the anode or cathode and the reference electrode, minimizes the voltage drop due to solution resistance and permits direct measurement of the anode or cathode potential with respect to the reference electrode.

To determine the cathode potential of a test electrode, a voltage is impressed between the anode and test cathode, such that a current density of 200 ma/cm$^2$ is established at the cathode. The current density is the current measured by the ammeter in milliamps divided by the area (i.e., 1 cm$^2$) of the porous Raney nickel alloy surface of the test electrode exposed to catholyte. Thus 200 ma would be applied to cathode 11 to achieve a current density of 200 ma/cm$^2$. Hydrogen gas, generated at the cathode is removed from the cathode compartment through catholyte outlet 14. Chlorine gas, generated at anode 21, is similarly removed through anolyte outlet 24. The cell is operated in this manner for at least 2 hours prior to reading the cathode potential directly from the voltmeter.

Although the test cell was operated with porous cation exchange resin, the electrode of this invention is also useful in electrolytic cells which utilize diaphragms as well as liquid impermeable cation exchange membranes.

Typical industrial electrochemical cells which may be adapted to the process of this invention are disclosed in U.S. Pat. No. 4,062,743 which issued Dec. 13, 1977 to Ahn et al., U.S. Pat. No. 4,233,122 which issued Nov. 11, 1980 to Lynch et al. and U.S. Pat. No. 4,253,923 which issued Mar. 3, 1981 to Lynch et al., all of which are hereby incorporated by reference in their entirety. Although these may differ in the specific structural designs employed, schematically they all conform to the general configuration as exemplified in FIG. 2.

Thus, for the purposes of this invention, anode 21 may be any conventional electrically conductive electrolytically active material resistant to the anolyte such as graphite or, preferably, a valve metal such as titanium, tantalum or alloys thereof bearing on its surface a noble metal, a noble metal oxide (either alone or in combination with a valve metal oxide) or other electrolytically active, corrosion resistant materials. Anodes of the preferred class are called dimensionally stable anodes and are well known and widely used in industry; see, for example, U.S. Pat. Nos. 3,117,023, 3,632,498, 3,840,443 and 3,846,273. While solid anodes may be used, generally foraminous anodes such as expanded mesh sheet, are preferred since they have greater electrolytically active surface areas and facilitate the formation, flow and removal of chlorine gas from the anolyte compartment.

For cathode 11 as with anode 18, solid structures may be used. However, generally foraminous (screen, expanded mesh, apertured and the like) materials are preferred to facilitate the generation, flow and removal of hydrogen gas from the cathode compartment.

Where membrane 2 is used in the electrolytic cell in carrying out the process of this invention, it is preferably a permselective cation exchange hydraulically semipermeable or impermeable membrane selected from one of several groups of materials. Suitable membranes in these groups include amine-substituted polymers, unmodified perfluorosulfonic acid laminates, homogeneous perfluorosulfonic acid laminates and carboxylic acid substituted polymers.

The first group of membranes includes amine substituted polymers such as diamine and polyamine substituted polymers of the type described in U.S. Pat. No. 4,030,988, issued on June 21, 1977 to Walther Gustav Grot and primary amine substituted polymers described in U.S. Pat. No. 4,085,071, issued on Apr. 18, 1978 to Paul Raphael Resnick et al (hereafter called simply "'071 Patent"). Both of the above patents are incorporated herein in their entirety by reference.

With reference to the diamine and polyamine substituted polymers of U.S. Pat. No. 4,030,988 (hereafter called simply "'988 Patent"), supra, the basic precursor sulfonyl fluoride polymer of U.S. Pat. No. 4,036,714, issued on July 19, 1977 to Robert Spitzer (hereafter called simply "'714 Patent"), and incorporated herein in its entirety by reference, is first prepared and then reacted with a suitable diamine, such as ethylene diamine, or polyamine to a selected depth wherein the pendant sulfonyl fluoride groups react to form N-monosubstituted sulfonamido groups or salts thereof. The thickness of amine substituted polymers of the first group is in the range from about 4 to about 10 and preferably in the range from about 5 to about 8 mils.

The selected depth is typically in the range from about 1.0 to about 7.0 and preferably from about 1.2 to about 1.5 mils.

In preparing the basic precursor sulfonyl fluoride as described in the '714 Patent above, the preferred copolymers utilized in the film are fluoropolymers of polyfluorocarbons although others can be utilized as long as there is a fluorine atom attached to the carbon atom which is attached to the sulfonyl group of the polymer. A preferred copolymer is a copolymer of tetrafluoroethylene and perfluoro (3,6-dioxa-4-methyl-7-octenesulfonyl fluoride) which comprises 10 to 60 percent and preferably 25 to 50 percent by weight of the latter. Surface sulfonyl groups are then converted to form diamine and octyamino groups or salts thereof through the reaction of the diamine, such as ethylene diamine.

With only surface conversion of the sulfonyl halide groups, further conversion of the remaining sulfonyl halide groups to the ionic form is most desirable. The prior art techniques of conversion of the $-SO_2X$ groups with X as chlorine or fluorine may be undertaken such as by hydrolysis. The techniques set forth in Connolly et al., U.S. Pat. No. 3,282,875 and/or Grot, U.S. Pat. No. 3,784,399 may be employed. Illustratively, the unconverted sulfonyl groups of the polymer may be converted to the form $-(-SO_2NH)_mQ$ wherein Q is H, $NH_4$, cation of an alkali metal and/or cation of an alkaline earth metal and m is the valence of Q. Preferred definitions of Q include $NH_4$, and particularly sodium or potassium. Additionally, the unconverted sulfonyl groups may be formed to $-(SO_3)_nMe$ wherein Me is a cation and n is the valence of the cation. Preferred definitions of Me include potassium, sodium and hydrogen.

As employed in this disclosure, a di- or polyamine is defined as an amine which contains at least two amino groups with one primary amino group and the second amino group either primary or secondary. Additional amino groups may be present so long as the above-defined amino groups are present.

Specific amines falling within the above definition are included within the disclosure in U.S. Pat. No. 3,647,086, issued to Mizutani et al. on May 7, 1972, which disclosure of amines is incorporated by reference herein.

Typical membranes of the first group prepared from ethylene diamine which may be employed in the process of this invention include (a) a homogeneous film about 7 mils thick of about 1200 equivalent weight perfluorosulfonic acid resin which has been chemically modified by ethylene diamine converting a depth of about 1.5 mils to the perfluorosulfonamide, (b) a homogeneous film about 7 mils thick of 1150 equivalent weight perfluorosulfonic acid resin which has been chemically modified by ethylene diamine converting a depth of about 1.5 mils to the perfluorosulfonamide, and (c) a homogeneous film about 7 mils thick of 1150 equivalent weight perfluorosulfonic acid resin which has been chemically modified by ethylene diamine converting a depth of about 1.2 mils to the perfluorosulfonamide.

For the above-mentioned amine-substituted membranes, a laminated inert cloth supporting fabric may be employed. The thickness of the laminated inert cloth supporting fabric is in the range from about 3 to about 7 and preferably from about 4 to about 5 mils. The inert cloth supporting fabric is typically comprised of polytetrafluoroethylene, rayon, or mixtures thereof.

An example of diamine substituted polymer is a perfluorosulfonic acid polymer comprised of a homogeneous film about 7 mils thick, of about 1150 equivalent weight perfluorosulfonic acid resin which has been chemically modified on one side by ethylene diamine converting a depth of about 1.5 mils of the polymer to perfluorosulfonamide. The unmodified side is laminated to a fabric of polytetrafluoroethylene resin. The fabric is characterized by having a basic weave pattern, a thread count of about 6×6 polytetrafluoroethylene, 24×24 rayon per centimeter, a denier of about 200 polytetrafluoroethylene and 50 rayon, a fabric thickness of about 4.6 mils and an open area (Optical) of about 70 percent by volume after rayon removed.

The ethylene diamine treated side of the membrane is oriented toward the cathode in the electrolytic cell.

Also included in this first group of membranes are polymers similar to the above '988 Patent which are prepared as described in U.S. Pat. No. 4,085,071, supra, wherein surface sulfonyl groups of the backbone sulfonated fluorine polymers are reacted to a selected depth with a primary amine such as with heat treatment of the converted polymer to form N-monosubstituted sulfonamido groups or salts on the sulfonyl fluoride sites of the copolymer through the reaction of the primary amide.

With respect to the diamine or polyamine substituted polymers of the '988 Patent and the primary amine polymers of the '071 Patent described above, the modifications are generally performed on only one side of the membrane. The thickness of the diamine and polyamine substituted polymers is in the range from about 4 to about 10 and preferably in the range from about 5 to about 9 mils. The depth of the modification is in the range from about 1.0 to about 7.0 and preferably from about 1.2 to about 1.5 mils.

The amine treated side of the membrane is also oriented toward the cathode.

The second group of materials suitable as membranes in the process of this invention includes perfluorosulfonic acid membrane laminates which are comprised of at least two unmodified homogeneous perfluorosulfonic acid films. Before lamination, both films are unmodified and are individually prepared in accordance with the basic '714 Patent previously described.

The first film has a thickness in the range from about 0.5 to about 2.0 mils, of about 1500 equivalent weight perfluorosulfonic acid resin, and the second film has a thickness in the range from about 4.0 to about 6.0 mils, of about 1100 equivalent weight perfluorosulfonic acid resin.

After lamination together to form a single film, the resulting membrane is positioned in the electrolytic cell with the thinner, higher equivalent weight side of the resulting film oriented toward the catholyte chamber.

Typical laminated membranes of the second group which may be employed in the process of this invention include (a) a homogeneous film about 1 mil thick of about 1500 equivalent weight perfluorosulfonic acid resin and a homogoneous film about 5 mils thick of about 1100 equivalent weight perfluorosulfonic acid resin; (b) a homogeneous film about 1.5 mils thick of about 1500 equivalent weight perfluorosulfonic acid resin and a homogeneous film about 5 mils thick of about 1100 equivalent weight perfluorosulfonic acid resin; (c) a homogeneous film about 2 mils thick of about 1500 equivalent weight perfluorosulfonic acid resin and a homogeneous film about 4 mils thick of 1100 equivalent weight perfluorosulfonic acid resin; and (d) a homogeneous film about 1.5 mils thick of about 1500 equivalent weight perfluorosulfonic acid resin and a homogeneous film about 4 mils thick of about 1100 equivalent weight perfluorosulfonic acid resin.

For selected laminated membranes, a laminated inert cloth supporting fabric may be employed. The thickness of the laminated inert cloth supporting fabric is in the range from about 3 to about 7 and preferably from about 4 to about 5 mils. The inert supporting fabric is typically comprised of polytetrafluoroethylene, rayon, or mixtures thereof.

The third group of materials suitable as membranes in the process of this invention includes homogeneous perfluorosulfonic acid membrane laminates. These are comprised of at least two unmodified perfluorosulfonic acid films of 1200 equivalent weight laminated together with an inert cloth supporting fabric of the types described hereinabove.

Typical laminated membranes of the third group which may be employed in the process of this invention include (a) a homogeneous film about 7 mils thick laminated with a "basket weave" of polytetrafluoroethylene fabric and (b) a homogeneous film about 7 mils thick laminated with a "leno weave" with a fabric comprised of polytetrafluoroethylene fibers having rayon fibers interspersed therein.

The fourth group of membranes suitable for use as membranes in the process of this invention include carboxylic acid substituted polymers described in U.S. Pat. No. 4,065,366, issued to Oda et al on Dec. 27, 1977. The teaching of that patent is incorporated herein in its entirety by reference.

The carboxylic acid substituted polymers of U.S. Pat. No. 4,065,366, are prepared by reacting a fluorinated olefin with a comonomer having a carboxylic acid group or a functional group which can be converted to a carboxylic acid group.

The fluorinated olefin monomers and the comonomers having carboxylic acid group or a functional group which can be converted to carboxylic acid group for using the production of the copolymer for the membranes can be selected from the defined groups below.

It is preferable to use monomers for forming the units (a) and (b) in the copolymers.

   (a)

   (b)

wherein X represents —F, —Cl, —H or —$CF_3$ and X' represents —F, —Cl, —H, —$CR_3$ or $CF_3(CF_2)_m$—; m represents an integer of 1 to 5 and Y represents —A, —$\phi$—A, —P—A, —O—$(CF_2)_n$ (P, Q, R—A; P represents —$CF_2)_a(CXX')_b(CF_2)_c$; Q represents —$CF_2$—O—$CXX')_d$; R represents —$CXX'$—O—$CF_2)_e$; (P, Q, R) represents a discretional arrangement of at least one of P, Q and R; $\phi$ represents phenylene group, X,X' are defined above; n=0 to 1; a, b, c, d and e represent 0 to 6; A represents —COOH or a functional group which can be converted to —COOH by hydrolysis or neutralization such as —CN, —COF, —$COOR_1$, —COOM, —$CONR_2R_3$; $R_1$ represents a $C_{1-10}$ alkyl group; M represents an alkali metal or a quarternary ammonium group and $R_2$ and $R_3$, respectively, represent hydrogen or a $C_{1-10}$ alkyl group.

The typical groups of Y have the structure having A connected to a carbon atom which is also connected to at least one fluorine atom, and include

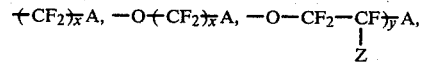

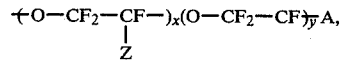

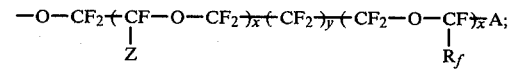

wherein x, y and z, are respectively, 1 to 10; Z and $R_f$, respectively, represent —F and a $C_{1-10}$ perfluoroalkyl group A is as defined above. In the case of the copolymers having the units (a) and (b), it is preferable to have 1 to 40, especially 30 to 20 mole percent of the unit (b) in order to produce the membrane having an ion-exchange capacity in said range. The molecular weight of the fluorinated copolymer is important because it relates to the tensile strength, ease of fabrication, the water permeability and the electrical properties of the resulting fluorinated cation exchange membrane.

Typical carboxylic acid polymers include copolymer of tetrafluoroethylene and

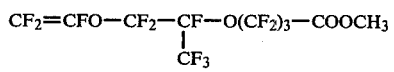

copolymerized with a catalyst of azobisisobutyronitrile in trichlorotrifluoroethane to obtain a fluorinated copolymer having an ion exchange capacity of about 1.17 meq/g polymer and a $T_g$, glass transition temperature, of 190° C. press-molded to form a film about 200 microns thick and thereafter hydrolyzed in an aqueous methanol solution of sodium hydroxide, (b) a copolymer of tetrafluoroethylene and CF$_2$=CFO—(CF$_2$)$_3$—COOCH$_3$ copolymerized with a catalyst of azobisisobutyronitrile to obtain a fluorinated copolymer having an ion exchange capacity of about 1.45 meq/g polymer and a T$_g$ of about 235° C., press-molded to form a film of thickness about 200 microns and hydrolyzed in an aqueous methanol solution of sodium hydroxide, (c) a copolymer of tetrafluoroethylene and

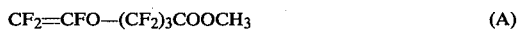

CF$_2$=CFO—(CF$_2$)$_3$COOCH$_3$  (A)

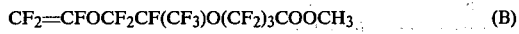

CF$_2$=CFOCF$_2$CF(CF$_3$)O(CF$_2$)$_3$COOCH$_3$  (B)

copolymerized with a catalyst of azobisisobutyronitrile (mole ratio A/B of about 4:1) to obtain a fluorinated copolymer having an ion exchange capacity of about 1.45 meq/g polymer and T$_g$ of about 220° C., press-molded to obtain a film of about 200 microns thickness, and hydrolyzed in an aqueous methanol solution of sodium hydroxide, and (d) a copolymer of tetrafluoroethylene and CF$_2$=CFO—(CF$_2$)$_3$—COOCH$_3$ were copolymerized with a catalyst of ammonium persulfate in water to obtain a fluorinated copolymer having an ion-exchange capacity of 1.20 meq/g polymer and T$_g$ of 210° C., the copolymer extruded to obtain a film having a thickness of 250 microns and width of 15 centimeters and plied to a cloth made of a copolymer of tetrafluoroethylene and ethylene (50 mesh:thickness 150 microns), compress-molded to form a reinforced film and hydrolyzed in an aqueous methanol solution of sodium hydroxide to obtain a carboxylic acid type fluorinated cation exchange membrane. For selected membranes, a laminated inert cloth supporting fabric having a thickness from about 3 to about 7 and preferably from about 4 to about 5 mils may be employed. This is typically comprised of polytetrafluoroethylene, rayon or mixtures thereof.

Most recently, composite membranes have been produced in the form of laminated structures comprising a first fluorinated polymer layer containing sulfonic acid functional side groups and a second fluorinated polymer layer containing carboxylic acid functional side groups. Such laminated membranes have been disclosed in U.S. Pat. No. 4,225,240 issued to Molnar et al. on Mar. 10, 1981, and hold promise of providing significant increases in the current efficiency of chlor-alkali cells.

For selected laminated membranes, a laminated inert cloth supporting fabric may be employed. The thickness of the laminated inert cloth supporting fabric is in the range of from about 3 to about 7 and preferably from about 4 to about 5 mils. The inert supporting fabric is typically comprised of polytetrafluoroethylene, rayon, or mixtures thereof.

The distance between an electrode, such as the anode or the cathode, to the membrane is known as the gap distance for that electrode. The gap distance of the anode to membrane and the cathode to membrane are both independently variable. Changing these respective distances concurrently or individually may affect the operational characteristics of the electrolytic cell and is reflected in the calculated current efficiency. When using a purified brine solution as the anolyte at a concentration in the range of from about 300 to about 400 grams per liter, the preferable anode to membrane gap distance is in the range from about 0.1 to about 2.5 centimeters, and the preferable cathode to membrane gap distance is in the range from about 0.1 to about 1.7 centimeters.

When the electrode is intended for use in a brine-electrolysis diaphragm cell, the diaphragm can be applied directly to the porous nickel surface of the electrode as noted in the '895 Patent.

The electrode of this invention can be utilized as a hydrogen evolution cathode to generate hydrogen using plain water as the electrolyte or brine as the electrolyte in cells having no means of separation between the anode and cathode. However, when water is the electrolyte, special provisions may be necessary to handle the oxygen generated by such electrolysis at the cell anode. When an alkali metal halide brine is the electrolyte, hydrogen is produced at the cathode and the brine by electrolysis forms a chlorate such as sodium chlorate, potassium chlorate, and the like.

In each of the examples, electrodes are prepared and tested as cathodes in brine electrolysis test cells. All characterizations are carried out in accordance with the test procedures described above. Unless stated otherwise, all compositions are given as weight percentages.

EXAMPLE A

Three electrodes were prepared as follows:
1. Mild Steel.
A thoroughly cleaned mild steel coupon.
2. β-Raney Ni-Mo-Ti on Ni-Mo-Ti core (dipped). A 1.6 mm thick Ni-Mo-Ti alloy sheet, assaying Ni 0.86, Mo 0.12, Ti 0.02 is cut into a coupon measuring about one cm$^2$. The coupon which is to become the core of the electrode is thoroughly cleaned by degreasing with acetone, lightly etching with 10 percent HCl, rinsing with water and after drying, grit blasting with No. 24 grit Al$_2$O$_3$ at a pressure of 3.4 kg/cm$^2$ (50 psi).

The cleaned nickel alloy coupon is aluminized by applying a commercial flux and then dipping in a pot of molten aluminum for a sufficient time to entirely coat the coupon with aluminum.

The aluminized nickel alloy coupon is heat treated at 725° C. for 10 minutes in a nitrogen atmosphere to interdiffuse the nickel and aluminum and form a layer which is predominantly Gamma phase (Ni$_2$Al$_3$) nickel aluminide. After heat treating, the coupon is allowed to cool in a current of nitrogen for about 2 hours. This produces a predominantly NiAl$_3$ interdiffused layer.

The cooled coupon is then subjected to a caustic leaching treatment wherein the aluminum is selectively removed from the interdiffused layer to leave an active porous Raney nickel alloy surface on the coupon. The leaching treatment consists of immersing the interdiffused coupon in 10 percent NaOH for 20 hours, without temperature control, followed by 2 hours in 30 percent NaOH at 80° C. The coupon was then rinsed with water for 30 minutes.

3. β-Raney Ni-12Mo on Ni-12Mo core (dipped). A 1.6 mm thick sheet of an alloy assaying at least 86 percent nickel and 12.0±0.1 percent Mo (Ni-12Mo) is cut into a circular coupon measuring about one cm$^2$. The coupon which is to become the core of the electrode is thoroughly cleaned by degreasing with acetone, lightly etching with 10 percent HCl, rinsing with water and after drying, grit blasting with No. 24 grit Al$_2$O$_3$ at a pressure of 3.4 kg/cm$^2$ (50 psi).

The cleaned nickel-molybdenum coupon is aluminized by applying a commercial flux and then dipping in a pot of molten aluminum for a sufficient time to entirely coat the coupon with aluminum.

The aluminized nickel-molybdenum coupon is heat treated at 725° C. for 10 minutes in a nitrogen atmosphere to interdiffuse the nickel and aluminum and form a layer which is predominantly Gamma phase ($Ni_2Al_3$) nickel aluminide. After heat treating, the coupon is allowed to cool in a current of nitrogen for about 2 hours. This produces a predominantly $NiAl_3$ interdiffused layer.

The cooled coupon is then subjected to a leaching treatment wherein the aluminum is selectively removed from the interdiffused layer to leave an active porous nickel-molybdenum surface on the coupon. The leaching treatment consists of immersing the interdiffused coupon in 10 percent NaOH for 20 hours, without temperature control, followed by 2 hours in 30 percent NaOH at 80° C. The coupon is then rinsed with water for 30 minutes.

Each coupon was tested as cathode 11 in test cell 1 of FIG. 2 in accordance with the above-described procedure.

The cathode potentials are monitored for 45 days to determine if the potential experienced a steady increase or instead leveled out at some value.

The results are plotted in FIG. 1. It is seen that Raney Ni-12Mo-2Ti of coupon 2 had a surprising lower hydrogen overvoltage than the Raney Ni-12Mo alloy of coupon 3 and the mild steel of coupon 1.

What is claimed is:

1. A method of generating hydrogen from a hydrogen evolution cathode in an electrolytic cell by passing an electric current through an aqueous electrolyte between an anode and a hydrogen evolution cathode, said cathode being comprised of a monolithic structure having a surface formed from an integral precursory, adherent Raney Beta phase quaternary alloy represented by the formula $Ni_xMo_yTi_zAl_3$, where x is the weight percent of nickel, y is the weight percent of molybdenum and z is the weight percent of titanium, in the combined weight of nickel, molybdenum and titanium, and where x ranges from about 75 to about 94 percent by weight, y ranges from about 20 to about 5 percent by weight and z ranges from about 5 to about 1 percent by weight, and which has had from about 75 to about 95 percent of the aluminum leached from said surface with a strong aqueous base so as to form an active porous Raney Beta phase nickel-molybdenum-titanium surface layer whereby the hydrogen overvoltage of said surface is reduced.

2. The method of claim 1 wherein x ranges from about 80 to about 88, y ranges from about 10 to about 16 and z ranges from about 2 to about 4 weight percent of the Ni-Mo-Ti molecular portion.

3. A method of generating hydrogen from a hydrogen evolution electrode in an electrolytic cell by passing an electric current through an aqueous electrolyte between an anode and a hydrogen evolution cathode, said cell further having a membrane separating said cell into an anode compartment and a cathode compartment, said cathode being comprised of a monolithic structure having a surface formed from an integral precursory, adherent Raney Beta phase quaternary alloy represented by the formula $Ni_xMo_yTi_zAl_3$, where x is the weight percent of nickel, y is the weight percent of molybdenum and z is the weight percent of titanium, in the combined weight of nickel, molybdenum and titanium, and where x ranges from about 75 to about 94 percent by weight, y ranges from about 20 to about 5 percent by weight and z ranges from about 5 to about 1 percent by weight, and which has had from about 75 to about 95 percent of the aluminum leached from said surface with a strong aqueous base so as to form an active porous Raney Beta phase nickel-molybdenum-titanium surface layer whereby the hydrogen overvoltage of said surface is reduced.

4. The method of claim 3 wherein said membrane comprises a membrane made from a perfluorinated polymer having lateral side chains, said side chains being selected from the class consisting of carboxylic acid and sulfonic acid functional groups.

5. The method of claim 4 wherein said membrane has carboxylic acid functional side groups.

6. The method of claim 5 wherein said membrane has sulfonic acid functional side groups.

7. The method of claim 6 wherein said membrane comprises a first fluorinated polymer layer containing sulfonic acid functional side groups and a second fluorinated polymer layer containing carboxylic acid functional side groups.

8. The method of claim 3 wherein x ranges from about 80 to about 88, y ranges from about 10 to about 16 and z ranges from about 2 to about 4 weight percent of the Ni-Mo-Ti molecular portion.

* * * * *